(12) United States Patent
Wetsch

(10) Patent No.: US 11,485,559 B2
(45) Date of Patent: *Nov. 1, 2022

(54) INFLATABLE PACKAGING WITH TEAR INITIATION FEATURE

(71) Applicant: Pregis Innovative Packaging LLC, Deerfield, IL (US)

(72) Inventor: Thomas D. Wetsch, Naples, FL (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,115

(22) Filed: Aug. 2, 2021

(65) Prior Publication Data

US 2021/0362929 A1    Nov. 25, 2021

Related U.S. Application Data

(63) Continuation of application No. 16/541,123, filed on Aug. 14, 2019, now Pat. No. 11,078,001.

(Continued)

(51) Int. Cl.
| | |
|---|---|
| *B65B 41/02* | (2006.01) |
| *B65D 75/52* | (2006.01) |
| *B65D 75/42* | (2006.01) |
| *B65D 75/48* | (2006.01) |
| *B65D 81/05* | (2006.01) |
| *B26F 1/18* | (2006.01) |

(Continued)

(52) U.S. Cl.
CPC .............. *B65D 75/527* (2013.01); *B26F 1/18* (2013.01); *B31D 5/0073* (2013.01); *B65B 31/021* (2013.01); *B65B 41/02* (2013.01); *B65B 41/12* (2013.01); *B65B 47/08* (2013.01); *B65D 75/42* (2013.01); *B65D 75/48* (2013.01); *B65D 81/052* (2013.01); *B29C 66/1122* (2013.01); *B31D 2205/0023* (2013.01); *B31D 2205/0047* (2013.01); *B31D 2205/0058* (2013.01)

(58) Field of Classification Search
CPC ...... B65D 75/527; B65D 75/48; B65D 75/42; B65D 81/052; B26F 1/18; B65B 41/02; B65B 41/12; B65B 47/08; B65B 31/021
USPC .................... 53/403, 550, 553, 558; 206/522
See application file for complete search history.

(56) References Cited

U.S. PATENT DOCUMENTS

| | | |
|---|---|---|
| 4,982,845 A | 1/1991 | Prascak et al. |
| 5,041,317 A | 8/1991 | Greyvenstein |

(Continued)

*Primary Examiner* — Jacob K Ackun
(74) *Attorney, Agent, or Firm* — Fox Rothschild LLP

(57) ABSTRACT

An inflatable web is disclosed. The web includes first and second film plies sealed together via a plurality of generally transverse seals to define a first and second inflatable chambers and an inflation region. The chambers are inflatable with a fluid and operable to contain the fluid. The sealed plies have a first longitudinal edge and a second longitudinal edge. The web defines a separation region extending at least partially transversely across the web between the first and second inflatable chambers and is configured to facilitate separation thereof. The separation region includes a tear propagation line extending transversely across at least a portion of the web with an end of the tear propagation line terminating proximal to the first longitudinal edge of the web. The separation region includes a tear initiation feature including edges spaced apart from one another longitudinally to form a permanent opening in the web.

24 Claims, 10 Drawing Sheets

Related U.S. Application Data

(60) Provisional application No. 62/849,628, filed on May 17, 2019, provisional application No. 62/803,197, filed on Feb. 8, 2019, provisional application No. 62/723,396, filed on Aug. 27, 2018, provisional application No. 62/718,385, filed on Aug. 14, 2018.

(51) Int. Cl.
  *B31D 5/00* (2017.01)
  *B65B 41/12* (2006.01)
  *B65B 47/08* (2006.01)
  *B65B 31/02* (2006.01)
  *B29C 65/00* (2006.01)

(56) References Cited

U.S. PATENT DOCUMENTS

| | | | |
|---|---|---|---|
| 5,558,262 A | 9/1996 | Simhaee | |
| 5,862,914 A | 1/1999 | Farison et al. | |
| 6,135,281 A | 10/2000 | Simhaee | |
| 6,276,532 B1 | 8/2001 | Sperry et al. | |
| 6,447,864 B2 | 9/2002 | Johnson et al. | |
| 6,696,127 B1 | 2/2004 | Mitchell, Jr. | |
| 6,889,739 B2 * | 5/2005 | Lerner | B29C 49/58 |
| | | | 156/308.2 |
| 6,955,846 B2 | 10/2005 | Lerner | |
| 7,093,978 B2 | 8/2006 | Tan | |
| 7,513,090 B2 | 4/2009 | Wehrmann | |
| 7,897,219 B2 | 3/2011 | Wehrmann | |
| 7,926,507 B2 | 4/2011 | Wetsch et al. | |
| 8,061,110 B2 | 11/2011 | Wetsch | |
| 8,128,770 B2 | 3/2012 | Wetsch et al. | |
| 8,276,353 B2 * | 10/2012 | Reaves | B65B 51/303 |
| | | | 53/550 |
| 9,205,622 B2 | 12/2015 | Wehrmann | |
| 9,266,300 B2 | 2/2016 | Chuba | |
| 9,844,911 B2 | 12/2017 | Corbin et al. | |
| 10,131,094 B2 | 11/2018 | Shook et al. | |
| 2002/0166788 A1 | 11/2002 | Sperry et al. | |
| 2005/0160699 A1 * | 7/2005 | Perkins | B31D 5/0073 |
| | | | 53/403 |
| 2005/0266189 A1 | 12/2005 | Wehrmann | |
| 2006/0042191 A1 | 3/2006 | Lerner et al. | |
| 2006/0059865 A1 * | 3/2006 | Yampolsky | B31D 5/0073 |
| | | | 53/403 |
| 2006/0130435 A1 * | 6/2006 | Hada | B65B 25/146 |
| | | | 53/550 |
| 2006/0191817 A1 | 8/2006 | Nishi et al. | |
| 2007/0081745 A1 | 4/2007 | Tetenborg et al. | |
| 2008/0141620 A1 | 6/2008 | Szabo | |
| 2009/0110864 A1 | 4/2009 | Wehrmann et al. | |
| 2009/0293427 A1 | 12/2009 | Lerner et al. | |
| 2010/0218888 A1 | 9/2010 | Cooper et al. | |
| 2010/0282824 A1 | 11/2010 | Kannankeril et al. | |
| 2011/0049001 A1 | 3/2011 | Won | |
| 2011/0172072 A1 | 7/2011 | Wetsch et al. | |
| 2012/0187010 A1 | 7/2012 | Speith-Herfurth et al. | |
| 2014/0261752 A1 | 9/2014 | Wetsch | |
| 2015/0033669 A1 * | 2/2015 | Dobreski | B29C 48/08 |
| | | | 428/522 |
| 2015/0069106 A1 | 3/2015 | Wehrmann | |
| 2016/0137383 A1 | 5/2016 | Wetsch et al. | |

* cited by examiner

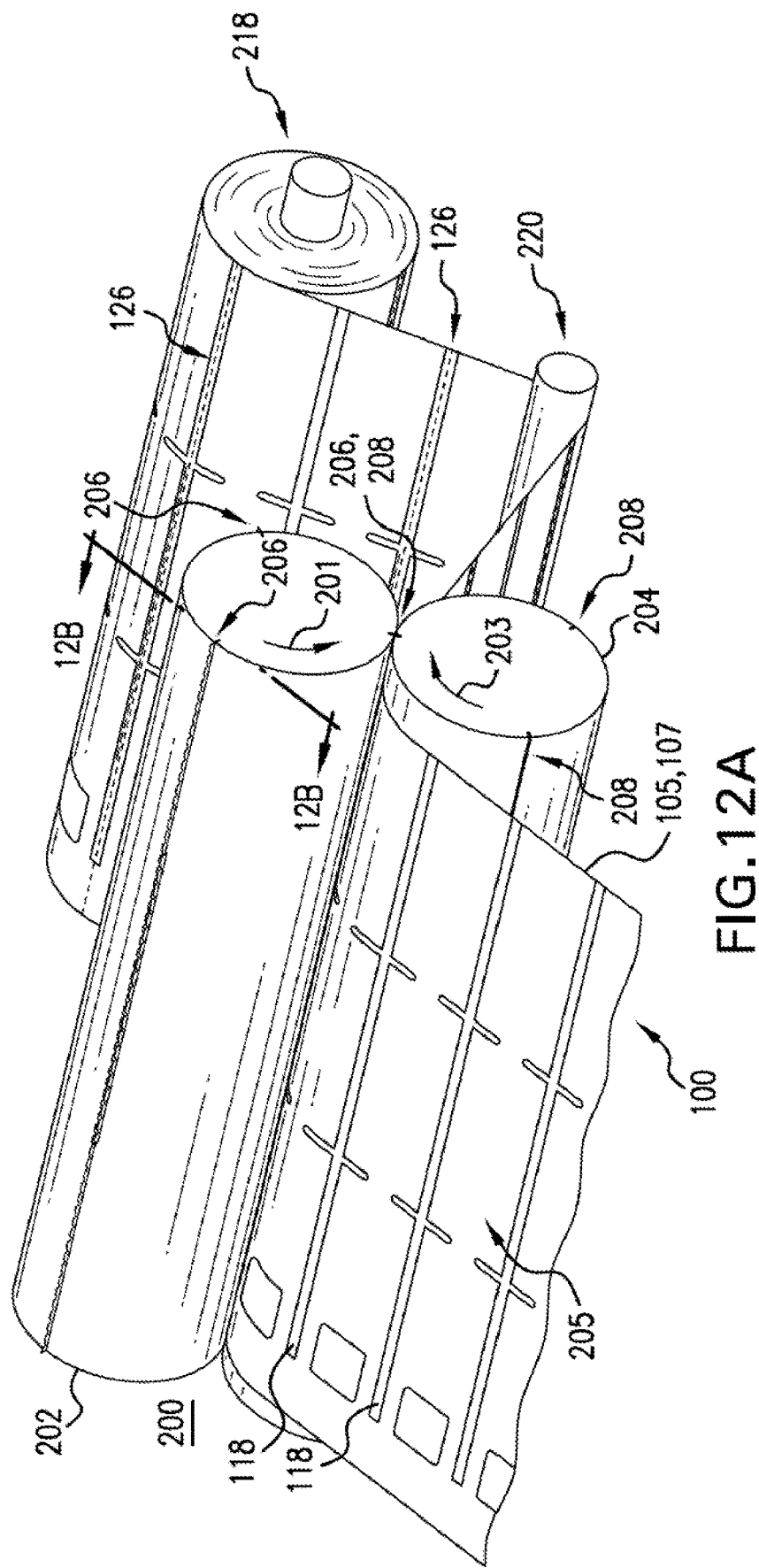

INFLATABLE PACKAGING WITH TEAR INITIATION FEATURE

CROSS-REFERENCE TO RELATED APPLICATIONS

This application is continuation of U.S. patent application Ser. No. 16/541,123, filed Aug. 14, 2019, which claims the benefit of priority pursuant to 35 U.S.C. § 119(e) of U.S. Provisional Patent Application Nos. 62/718,385 filed Aug. 14, 2018, entitled "INFLATABLE PACKAGING WITH TEAR INITIATION"; 62/723,396 filed Aug. 27, 2018, entitled "INFLATABLE PACKAGING WITH TEAR INITIATION"; 62/803,197 filed Feb. 8, 2019, entitled "INFLATABLE PACKAGING WITH TEAR INITIATION"; and 62/849,628 filed May 17, 2019, entitled "INFLATABLE PACKAGING WITH TEAR INITIATION", each of which is hereby incorporated by reference herein in their entireties for all purposes. Other inflatable packaging with tear initiation features are disclosed in U.S. Pat. No. 10,793,333, filed Aug. 14, 2019, entitled "INFLATABLE PACKAGING WITH OFFSET TEAR INITIATION FEATURES", which is hereby incorporated by reference herein in its entirety for all purposes.

FIELD OF THE INVENTION

The present invention relates generally to inflatable cushioning material for packaging and shipping, and more specifically, to segmented inflatable material with easily removable segments.

SUMMARY

An inflatable web is disclosed. The web includes a first film ply and a second film ply sealed to the first ply via a plurality of generally transverse seals. The plurality of transverse seals define first and second inflatable chambers therebetween. The inflatable chambers are inflatable with a fluid and operable to contain the fluid. The sealed plies having a first longitudinal edge and a second longitudinal edge. In accordance with various embodiments, the web defines a separation region extending at least partially transversely across the web between the first inflatable chamber and the inflatable second chamber. The separation region is configured to facilitate separation of the first and second inflatable chambers. In various embodiments, the separation region includes a tear propagation line extending transversally across at least a portion of the web. An end of the tear propagation line terminates proximal to the first longitudinal edge of the web or the inflation region. The separation region includes a tear initiation feature including edges spaced apart from one another longitudinally to form a permanent opening in the web, and close enough to the tear propagation line that a force imparted to the web via the tear initiation feature will facilitate the initiation of a tear of the web such that the tear propagates to an end of the tear propagation line and allowing for the tearing of the web to separate the first inflatable chamber from the second inflatable chamber.

In accordance with various embodiments, the tear propagation line includes a first line of weakness extending transversely across a portion of the web. The tear initiation feature is configured to facilitate the engagement between a user and the web for tearing. The tear initiation feature is suitable for a user to grasp the web by extending one of a hand, finger, or tool, through the web. The tear propagation line includes a second line of weakness extending transversely across at least a portion of the web with an end of the second line of weakness line terminating proximal to the second longitudinal edge of the web. The tear initiation feature is disposed between respective ends of the first line of weakness and the second line of weakness.

In accordance with various embodiments, respective lands are disposed between respective ends of the tear initiation feature and the first and second lines of weakness. Additionally or alternatively, the first line of weakness includes a line of perforations through at least one of the first ply or second ply. Additionally or alternatively, the second line of weakness includes a line of perforations through at least one of the first ply or second ply. The tear initiation feature is transversely offset from both the first and second longitudinal edges. The tear initiation feature is in a generally central position relative to the transverse width of the web.

In accordance with various embodiments, the tear propagation line and the tear initiation feature are sufficiently close that a tear initiated in the tear initiation feature propagates to the tear propagation line. The tear initiated in the tear initiation feature propagates to the tear propagation line to completely separate the first chamber from the second chamber. The first line of weakness extends transversely across the web from the first longitudinal edge to the second longitudinal edge. The tear initiation feature is longitudinally offset from the first line of weakness and the second line of weakness. The tear initiation feature includes a pair of openings through the web and the openings are transversely offset from one another. The tear initiation feature includes a third line of weakness extending transversely across a portion of the web, and the third line of weakness is longitudinally offset from the pair of openings. The perforations of the third line of weakness are transversely larger than the perforations of the first line of weakness and the second line of weakness.

BACKGROUND

Products and packages can be produced and/or shipped in a variety of containers and configurations for transportation and sale. Various packaging materials exist to protect the products and packages from being crushed or damaged during transportation. Such packaging materials form a protective outer layer over the products and packages and otherwise maintain the form factor of the products and packages within the shipping container. The packaging material can be wrapped one or more times around the products or packages or placed within empty spaces within the container. In this manner, the packaging material can be sized according to the size of the products or packages.

Inflatable packaging is a type of packaging material used to protect products and packages during transportation. This packaging material can be segmented to allow a user to select a particular number of inflatable segments based on the size of the product or package. The inflatable segments can be separated by a single tear strip, which allows a user to easily separate segments. Often, due to the nature of these single tear strips (e.g., a slit within the tear strip), a tear can initiate unintentionally. There is a need for a more efficient tearing mechanism.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 12A is an isometric view of a stamping machine for creating separation regions in a web according embodiments of the present disclosure;

Figure 1:
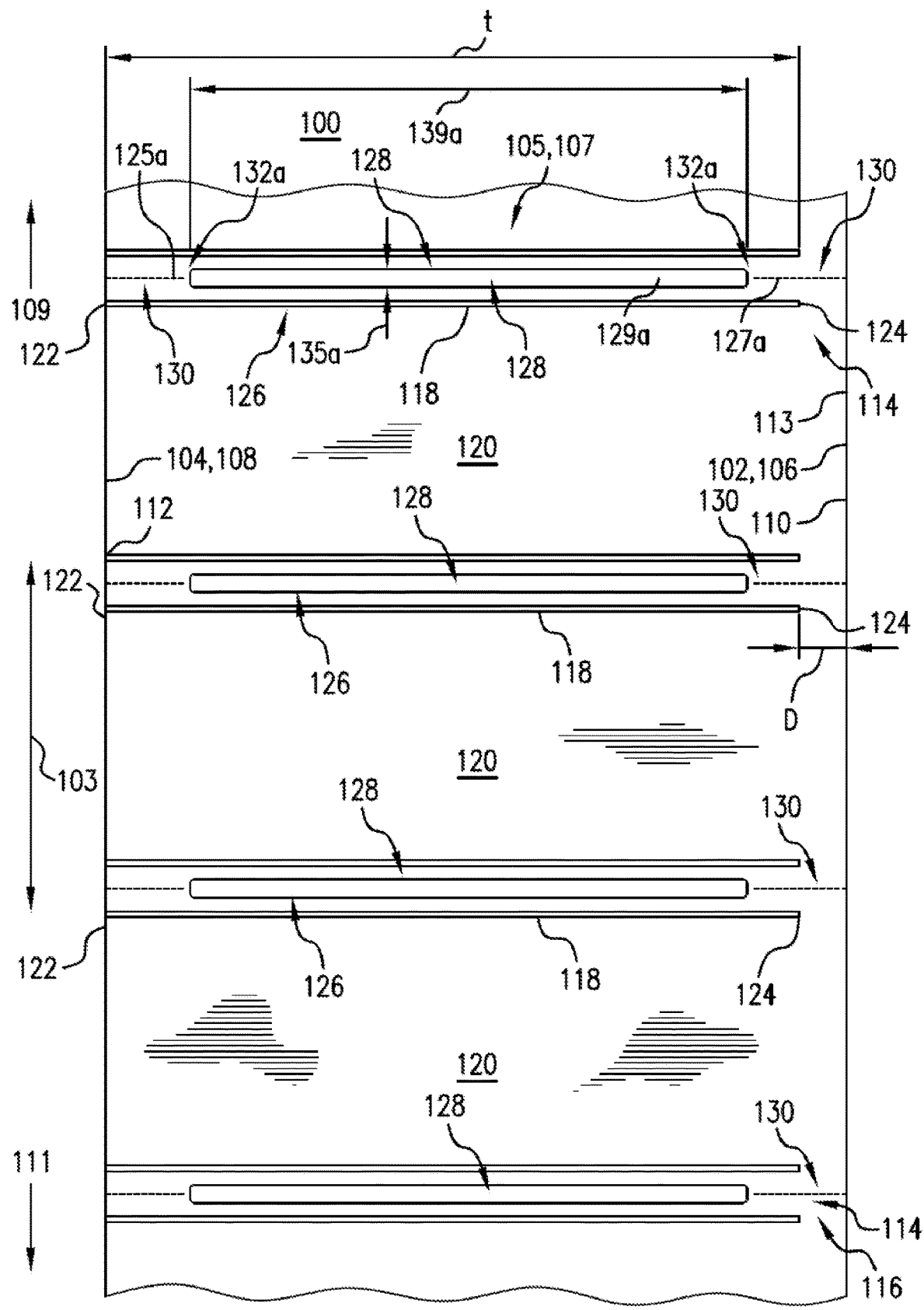
FIG. 1 is a schematic of a flexible structure for use with an inflation and sealing device.

all arranged in accordance with at least some embodiments of the present disclosure.

DETAILED DESCRIPTION

The present disclosure is directed to flexible structures that can be inflated and used as cushioning or protection for packaging and shipping. In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples can be utilized, and other changes can be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are implicitly contemplated herein.

As shown in FIG. 1, this disclosure is drawn, inter alia, to methods, systems, products, devices, and/or apparatus generally related to flexible structures. The flexible structure, such as a multi-ply web 100 of film, for inflatable cushions is provided. The web 100 includes a first web film layer, or ply, 105 having a first longitudinal edge 102 and a second longitudinal edge 104, and a second web film layer, or ply, 107 having a first longitudinal edge 106 and a second longitudinal edge 108. The longitudinal edges 102, 104, 106, 108 run in a longitudinal direction 103 of the web 100. The longitudinal direction of the web can be the direction that the web 100 is advanced into a processing machine. The longitudinal direction 103 can also be the direction that the web 100 is unrolled to be fed into a processing machine, or the direction that the finished structure is rolled onto a storage roll after processing. A longitudinal direction 103 can be longitudinally upstream or longitudinally downstream. A longitudinally upstream direction 109 is a longitudinal direction opposed to a direction of movement of the web 100 through a processing machine. A longitudinally downstream direction 111 is a direction that is substantially the same as a direction of the web 100 through a processing machine. Generally, a longitudinal direction 103 corresponds to the longest dimension of the web film layers 105,107. The second ply 107 is aligned to be overlapping and can be generally coextensive with the first ply 105 (as shown in FIG. 1), i.e., at least respective first longitudinal edges 102, 106 are aligned with each other and/or second longitudinal edges 104, 108 are aligned with each other. In some embodiments, the layers, or plies 105, 107, can be partially overlapping with inflatable areas in the region of overlap. The plies 105, 107 can be joined to define a first longitudinal edge 110 and a second longitudinal edge 112 of the film 100. A longitudinal seal 113 can be formed at the edge 110, and a longitudinal seal 115 can be formed at the edge 112. For example, the first longitudinal edges 102, 106 can be coupled together to form the first longitudinal edge of the film 100 and the second longitudinal edges 104, 108 can be coupled together to form the second longitudinal edge 112 of the film 100. The coupling of the respective edges forms an airtight seal at the first and second longitudinal edges 110, 112 of the film 100. The first and second plies 105, 107 can be formed from a single sheet of web material, a flattened tube (such as tube formed by blow molding) of web material with one edge slit, or two sheets of web material. For example, the first and second plies 105, 107 can include a single sheet of web material that is folded to define the joined second edges 104, 108 (e.g., "c-fold film"). Alternatively, for example, the first and second plies 105, 107 can include a tube of web material (e.g., a flattened tube) that is slit along the aligned first longitudinal edges 102, 106. Further, for example, the first and second plies 105, 107 can include two independent sheets of web material joined, sealed, welded, adhered, or otherwise attached together along the aligned second edges 104, 108.

The web 100 can be formed from any of a variety of web materials known to those of ordinary skill in the art. Such web materials may include ethylene vinyl acetates (EVAs), metallocenes, polyethylene resins such as low density polyethylene (LDPE), linear low density polyethylene (LLDPE), and high density polyethylene (HDPE), and blends thereof. Other materials and constructions can be used. The disclosed web 100 can be rolled on a hollow tube, a solid core, or folded in a fan folded box, or in another desired form for storage and shipment.

As shown in FIG. 1, the web 100 included a series of transverse seals 118 disposed along the longitudinal extent of the web 100 in a transverse direction. A transverse direction is a direction extending at an angle to a longitudinal direction of the web 100. In some embodiments, the transverse direction is substantially perpendicular to the longitudinal direction. However, in other embodiments, a transverse direction can be at a non-perpendicular angle to the longitudinal direction, more than zero degrees and less than 90 degrees. A transverse seal 118 can extend in multiple transverse directions, such as a zig-zag, wave, undulating line, chevron, or other pattern. Each transverse seal 118 extends from the second longitudinal edge 112 toward the first longitudinal edge 110. The transverse seal 118 can extend toward an inflation channel 114, discussed in more detail below. Each transverse seal 118 has a first end 122 proximate the second longitudinal edge 112 of the film 100 and a second end 124 proximate the first longitudinal edge 110 of the film 100. The second end 124 can be spaced a transverse dimension D from the first longitudinal edge 110. The distance between the first end 122 and second end 124 defines the transverse width t of the transverse seal 118. Each transverse seal 118 embodied in FIG. 1 is substantially straight and extends substantially perpendicular to the second longitudinal edge 112 (e.g., transversely across the film 100). It is appreciated, however, that other arrangements of the transverse seals 118 are also possible. For example, in some embodiments, the transverse seals 118 have undulating patterns or zigzag patterns, or similar suitable designs. The transverse seals 118 as well as the sealed longitudinal edges 110, 112 can be formed from any of a variety of techniques known to those of ordinary skill in the art. Such techniques include, but are not limited to, adhesion, friction, welding, fusion, heat sealing, laser sealing, and ultrasonic welding. It is contemplated that the transverse seal 118 can be sealed along the entirety of its area (its traverse width t and longitudinal height L); however, it is also contemplated that the transverse seal can be sealed around a periphery with its middle portion unsealed, forming a pocket in its middle portion. For example, some embodiments transverse seals 118 can include unsealed areas such as rectangles, squares, circles, ovals, or other shapes within the seal area. It is also contemplated that the transverse seals 118 can be sealed with a longitudinal seal 113 proximate to the second ends 124. In other embodiments, a pair of substantially linear seals 118 can be disposed on either side of a separation region 126.

An inflatable chamber 120 is defined within a boundary formed by the second longitudinal edge 112 and a pair of adjacent transverse seals 118, such that the inflatable chambers 120 are sufficiently bounded to be inflatable by and contain a fluid when sealed. Suitable fluids can be gases such as air, carbon dioxide, nitrogen, or other suitable gases. Fluids can also be liquids or gels. When the inflatable chamber 120 is filled with a fluid, the web film layers, such as plies 105,107 are maintained apart from one another when the chamber is sealed, to provide cushioning. As shown in FIG. 1, a plurality of inflatable chambers 120 are positioned adjacent to one another along the longitudinal length of the web 100 forming inflatable segments 120 of the web 100. In some embodiments, the inflatable chambers can further include one or more interior seals. For example, the interior seals can seal the plies 105, 107 to one another at intermediate areas within the chamber 120. The interior seals can create bendable lines that allow for a more flexible web 100 that can be easily bent or folded. Such flexibility allows for the film 100 to wrap around regular and irregular shaped objects.

An inflation region, such as a closed passageway, which can be a longitudinal inflation channel 114, can be provided. The longitudinal inflation channel 114, as shown in FIG. 1, is disposed between the second end 124 of the transverse seals 118 and the first longitudinal edge 110 of the film 100. The longitudinal inflation channel 114 can extend longitudinally along the longitudinal edge 110 and an inflation opening 116 can be disposed on at least one end of the longitudinal inflation channel 114. The longitudinal inflation channel 114 has a transverse width D. In a preferred embodiment, the transverse width D is substantially the same distance as the transverse dimension between the first longitudinal edge 110 and second end 124. It is appreciated, however, that in other configurations other suitable transverse width D sizes can be used. In some embodiments, the inflation opening 116 includes a one-way valve such as those disclosed in U.S. Pat. No. 7,926,507, herein incorporated by reference in its entirety.

In various embodiments, the web 100 includes one or more separation regions 126. The separation region 126 facilitates separation of two adjacent inflatable chambers 120 such as by tearing the web 100 by hand or with the assistance of a tool or machine. A separation region 126 can facilitate either or both partial or total separation of adjacent inflatable chambers 120. As illustrated in the schematic of FIG. 1, the separation region 126 is positioned between chambers 120. In this way, chambers 120 can be easily separated from one another. In the embodiment of FIG. 1, thin transverse seals 118 are arranged adjacent to the separation regions 126, on either side. While illustrated adjacent to the seal 118, it is appreciated that the separation region 126 can also extend through the seal 118, or through unattached plies 105,107 such as through the chambers 120. As provided in more detail below in the various described embodiments, the separation region 126 can have a variety of configurations that allow a user's hand, finger, tool, or similar suitable feature to easily penetrate through the web 100 to initiate a tear in the web 100. The separation region 126 is disposed between adjacent inflatable chambers 120, and can be offset from the adjacent chambers 120 by at least a portion of a transverse seal 118. As shown in FIG. 1, a separation region 126 can be offset longitudinally from an inflatable chamber 120 with a transverse seal 118 disposed therebetween.

A tear initiation feature 128 is a region that helps a user tear the web 100 to separate adjacent inflatable chambers 120. In some embodiments, a tear initiation feature 128 helps a user start a tear in the web 100, by allowing a user to grasp, grip, hold, or pinch a portion of the web 100 adjacent to the tear initiation feature 128, such as a hole, handle, or opening suitable for a user to insert a hand, finger, or tool there through to grip an edge thereof. In this embodiment, the tear initiation feature 128 is a secondary opening 129a extending through portions of one or both web film layers 105,107 transversely across a portion of the web 100 that a user can insert a hand, finger, or tool through to grip a portion of the web 100. A tear initiation feature 128 can be a line of apertures that pierce through one or both web film layers 105,107. For example, the apertures can be perforations, slits, openings in the web 100. A tear initiation feature 128 can be a line of weakness that pierces through one web film layer 105, and another line of weakness longitudinally offset from the first line of weakness that pierces through the other web film layer 107.

A tear propagation line 130 is a line that is sufficiently close to a tear initiation feature 128 such that a pulling or tearing force imparted to the web 100 via a tear initiation feature 128 will cause a tear to initiate in the tear propagation line 130 and continue across a portion of the web 100 to separate two adjacent inflatable chambers 120. Also, a tear can initiate in a tear initiation feature 128, such as at the edges. A tear starting in a tear initiation feature 128 can continue into and through a tear propagation line 130 to separate adjacent inflatable chambers 120. In this embodiment, the tear propagation lines 130 extend from first and second longitudinal edges 102,104,106,108 across a portion of the web 100. A tear initiation feature 128 can be weaker than a tear propagation line 130. This allows for an easier start a tear in the web 100 via a tear initiation feature 128, and once started, propagate a tear through the tear propagation line 130 to separate adjacent inflatable chambers 120.

In accordance with one embodiment, as shown in FIG. 1, the inflatable chambers 120 can be separated by separation regions 126. It should, however, be appreciated that other embodiments, such as those discussed below in FIGS. 3-11 are also usable as separation regions 126 replaceable with the separation region 126 shown in the web 100 of FIG. 1. As shown in FIG. 1, the separation region 126 includes a tear initiation feature 128 and a tear propagation line 130. For example, a tear propagation line 130 includes a first line of weakness 127a and another tear propagation line 120 includes a second line of weakness 125a. The tear initiation feature 128 includes a secondary opening 129a extending transversely across a portion of the web 100. While the first line of weakness 127a is shown as extending across the inflation channel 114, denoted by the distance D in FIG. 1, it is appreciated that the first line of weakness 127a can also terminate with the seal 118 at or proximate seal end 124. The perforations forming the lines of weakness can be smaller than a finger, such as from about ⅟32nd of an inch to about ½ inch. Other perforations can be larger than a tip of a finger such as greater than about ½ inch to about 1 inch. Other perforations can be larger still from about 1 inch to several inches long.

In accordance with one embodiment, as shown in FIG. 1, the inflatable chambers 120 can be separated by separation regions 126a usable in conjunction with the web 100 of FIG. 1. As shown, the separation region 126a includes a tear initiation feature 128 and two tear propagation lines 130. A tear initiation feature 128 can cause a tear to initiate in the adjacent tear propagation lines 130 when a pulling force is applied to its edges. Force applied to the tear initiation feature 128 can cause a tear to start in one of the edges of the tear initiation feature 128. This may happen for example, if the edges of the tear initiation feature 128 have sharp bends cuts or other features that act as stress risers to initiate a tear. Such a tear may then continue on to the tear propagation lines 130 through the land 132a that separates the tear initiation feature 128 from the tear propagation line 130. In the embodiment shown, the tear propagation lines 130 include a first line of weakness 127a and a second line of weakness 125a extending transversely across a portion of the web 100. The first line of weakness 127a can be proximate the first longitudinal edge 110, while the second line of weakness 125a can be proximate the second longitudinal edge 112. While only two lines of weakness are depicted, other numbers of lines of weakness can extend transversely across the web 100. While the line of weakness 127a is shown as extending across the inflation channel 114, denoted by the distance D in FIG. 1, it is appreciated that the line of weakness 127a can also terminate with the seal 118 at or proximate seal end 124.

Figure 2:
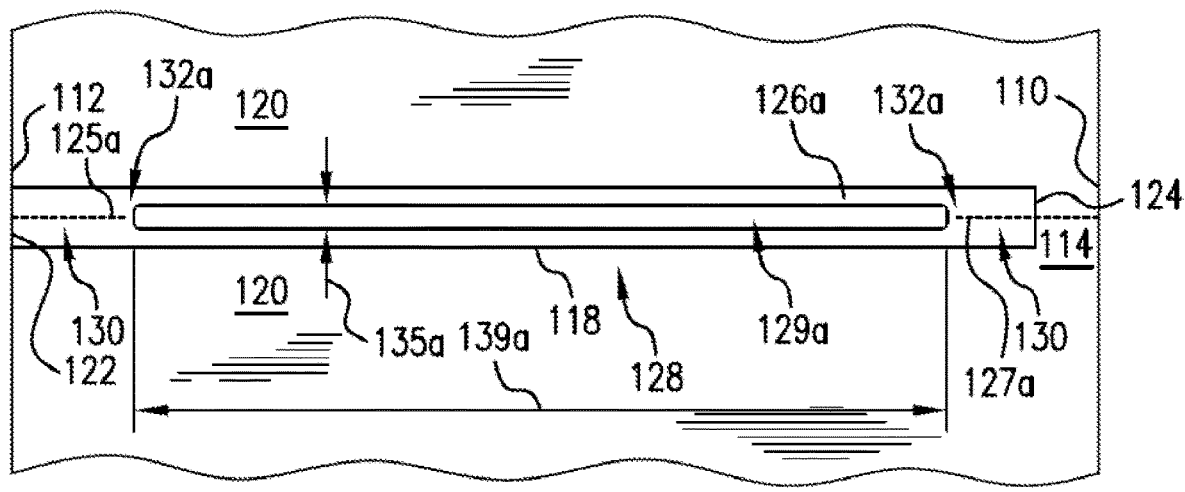
FIG. 2 is a schematic of a separation region usable in conjunction with the flexible structure of FIG. 1, in accordance with one embodiment.

The tear initiation feature 128 includes a secondary opening 129a. The secondary opening 129a can be any suitable opening, such as a handle, through the web 100 allowing a user to hold onto the web or otherwise extend a hand, finger, tool, or similar feature through the web 100. The secondary opening 129a can be an aperture through both plies 105,107 of the web 100. In other embodiments, a secondary opening can be an aperture through one of the plies 105,107 and not the other. The edges of the secondary opening 129a are spaced apart from one another longitudinally to form a permanent opening in the web 100. The plies 105,107 can be sealed to one another at the edges in some embodiments. In other embodiments, the plies may not be sealed to one another at the edges. As shown in FIG. 2, the corners of the secondary opening 129a are relatively sharp and can act as stress risers to help initiate tearing of the web 100. For example, a tear can initiate in a corner of the secondary opening 129a and continue to propagate to the first line of weakness 127a and/or the second line of weakness 125a to separate adjacent inflatable chambers 120. The secondary opening 129a can be a slit, a perforation, a rectangular or oval-shaped opening, or the like. As shown in FIG. 2, the secondary opening 129a can be a transverse aperture having both a significant longitudinal distance 135a and a significant transverse distance 139a. The transverse distance 139a is such that that a land 132a is disposed between respective ends of the secondary opening 129a and the respective lines of weakness 127a, 125a. The longitudinal distance 135a can be less than the transverse distance 139a of the secondary opening 129a. In this embodiment, the secondary opening 129a extends parallel to the line of weakness 127a and/or 125a. As shown, the first line of weakness 127a extends a transverse distance shorter than the transverse distance 139a of the secondary opening 129a. Additionally or alternatively, the second line of weakness 125a extends a transverse distance shorter than the transverse distance 139a of the secondary opening 129a. In some embodiments, the first line of weakness 127a and the second line of weakness 125a are the same length; however, it is contemplated that the lengths of either line of weakness 127a, 125a can vary.

Figure 3:
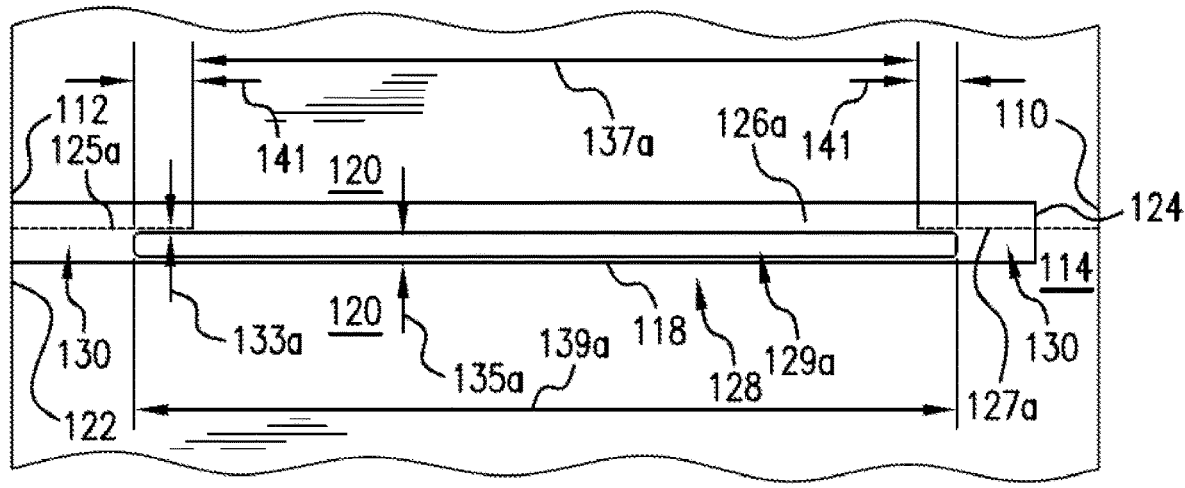
FIG. 3 is a schematic of a separation region usable in conjunction with the flexible structure of FIG. 1, in accordance with one embodiment.

FIG. 3 shows an embodiment similar to that of FIG. 2, where the secondary opening 129a is longitudinally offset from the lines of weakness 125a, 127a a distance 133a. In this embodiment, the tear initiation feature is longitudinally downstream of the tear propagation line 130. In other embodiments, the tear propagation line 130 can be longitudinally downstream of the tear initiation feature 128. The tear initiation feature 128 and the tear propagation line 130 are parallel to one another. The tear initiation feature 128 is longitudinally adjacent to the tear propagation line 130. The longitudinal offset of the tear initiation feature 128 from the tear propagation line 130 is such that a pulling force imparted to the web 100 via the tear initiation feature 128 when a user pulls on the tear initiation feature 128 can cause a tear to start or propagate through the tear propagation line 130, to separate the inflatable chambers 120 adjacent to a given separation region 126 containing both the tear initiation feature 128 and the tear propagation line 130

In some examples, the distance 133a is the same as or less than the connection distance between perforations in embodiments in which the lines of weakness 125a, 127a are perforations (e.g., FIG. 3 shows the lines of weakness 125a, 127a as transverse perforations). In other examples, the distance 133a is greater than the connection distance between perforations in embodiments in which the lines of weakness 125a, 127a are perforations. The longitudinal distance 135a can be greater than the offset 133a. The distance 133a can be determined by a shim or plate thickness equal to, greater than, or a multiple of, the knife thickness used for forming the lines of weakness. In some examples, the distance 133a is the same as or less than the connection distance between perforations in embodiments in which the line of weakness 127a is a perforation (e.g., FIG. 1 shows the line of weakness 127a as a transverse perforation).

The tear propagation lines 130, including the first and second lines of weakness 127a, 125a transversely overlap the tear initiation feature 128 by a distance 141. Further, it is contemplated that the first line of weakness 127a and the second line of weakness 125a can merge, forming a single line of weakness extending across a portion of the traverse width or across the entire traverse width of the web 100. As shown in FIG. 3, an intermediate land 137a can extend between the first line of weakness 127a and the second line of weakness 125a. The land 137a can be transversely the same length or shorter than the transverse distance 139a of the secondary opening 129a. In other embodiments, the land 137a can be transversely longer than the transverse distance 139a of the secondary opening 129a.

Figure 4:
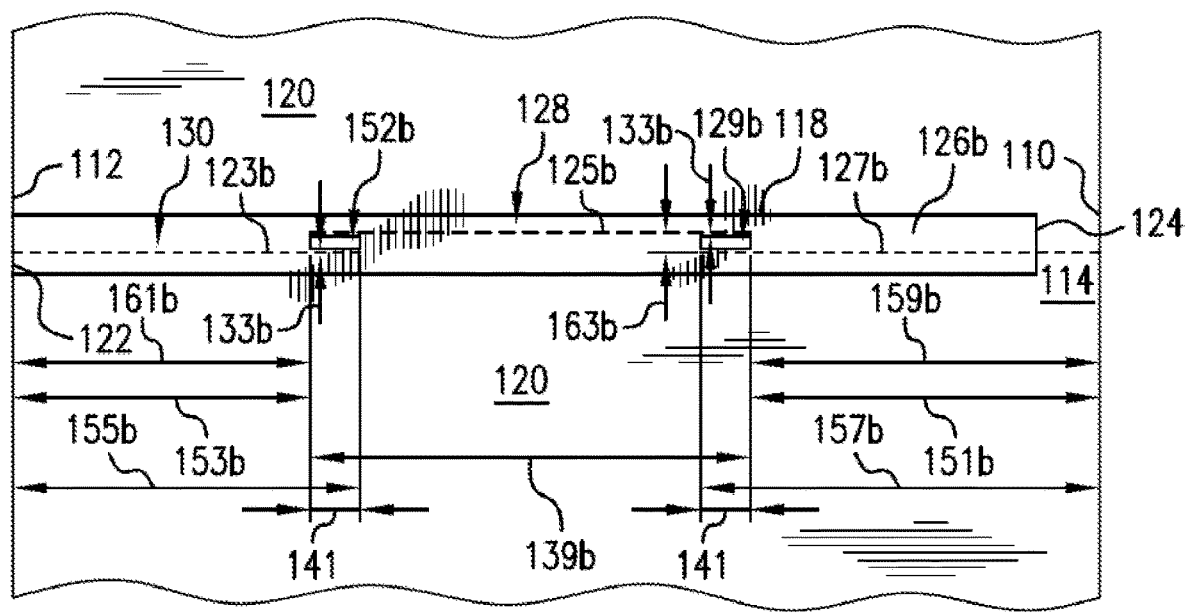
FIG. 4 is a schematic of a separation region usable in conjunction with the flexible structure of FIG. 1, in accordance with one embodiment.

In accordance with one embodiment, as shown in FIG. 4, the inflatable chambers 120 can be separated by separation regions 126b usable in conjunction with the web 100 of FIG. 1. As shown, the separation region 126b includes a tear initiation feature 128 and a tear propagation line 130. The tear propagation line 130 includes a first line of weakness 127b, a second line of weakness 123b. The tear initiation feature 128 includes a third line of weakness 125b extending transversely across a portion of the web 100. The tear initiation feature 128 can have one or more secondary openings 129b/152b. Like the secondary opening 129a of the embodiment of FIG. 2, the secondary openings 129b, 152b can have sharp corners or features that act as stress risers to help initiate or propagate tearing. Other embodiments may have smooth edges without stress risers such that tears are not likely to initiate in the openings 129b, 152b. The secondary openings 129b, 152b can be longitudinally offset from the first, second, and/or third lines of weakness 127b, 123b, 125b a distance 133b. While the first line of weakness 127b is shown as extending across the inflation channel 114, denoted by the distance D in FIG. 1, it is appreciated that the first line of weakness 127b can also terminate with the seal 118 at or proximate seal end 124. The first line of weakness 127b can extend transversely across the web 100 a distance 157b from the first longitudinal edge 110. The first line of weakness 127b can extend from the first longitudinal edge 110 in a direction perpendicular to the first longitudinal edge 110. The second line of weakness 123b can extend across the web 100 a distance 155b from the second longitudinal edge 112. The second line of weakness 123b extends perpendicular to the second longitudinal edge 112. In other embodiments, the first or second lines of weakness 127b, 123b can extend off-perpendicular to their respective edges 110, 112. The first line of weakness 127b and/or the second line of weakness 123b can be longitudinally offset from the third line of weakness 125b at a distance 163b. In some examples, the distance 163b is the same as or less than the connection distance between perforations in embodiments in which the line of weakness 127b or 123b is a perforation (e.g., FIG. 4 shows the line of weakness 127b as a transverse perforation). In other examples, the distance 163b is greater than the connection distance between perforations in embodiments in which the first line of weakness 127b and the second line of weakness 123b is a perforation (e.g., the row of holes shown in FIG. 4).

As shown in FIG. 4, the third line of weakness 125b can have a significant transverse distance 139b. The third line of weakness 125b extends parallel to the first line of weakness 127b and/or the second line of weakness 123b. In some embodiments, the first line of weakness 127b, the second line of weakness 123b, and the third line of weakness 125b are all co-linear. In other embodiments, the third line of weakness 125b is transversely offset from the first longitudinal edge 110 a distance 151b. Additionally or alternately, the third line of weakness 125b can be transversely offset from the second longitudinal edge 112 a distance 153b. In some embodiments, the third line of weakness 125b can be the same transverse length as the first line of weakness 127b, and/or the second line of weakness 123b. The first and second lines of weakness 127b, 123b transversely overlap the respective secondary openings 129b, 152b and the third line of weakness 125b by a distance 141. Although as shown the overlap 141 is the same for both the first line of weakness 127b and the second line of weakness 123b, it is contemplated that the overlaps 141 can be different relative to the different lines of weakness. The third line of weakness 125b can be any suitable line of weakness through the web 100 allowing a user to hold onto the web or otherwise extend a hand, finger, tool, or similar feature through the web 100. For example, the third line of weakness 125b can be a weaker line of weakness than the first line of weakness 127b and/or the second line of weakness 123b. For example, as shown in FIG. 4, the third line of weakness 125b is made of perforations that are longer in length than the perforations that form the first and second lines of weakness 125b. The secondary openings 129b, 152b can be any suitable opening through the web 100 allowing a user to hold onto the web or otherwise extend a hand, finger, tool, or similar feature through the web 100. For example, the secondary openings can have transverse distances 169b and longitudinal distances 167b. For example, the secondary opening 129b, 152b can be a slit, a perforation, a rectangular or oval-shaped opening, or the like. As shown in FIG. 4, the secondary openings 129b, 152b can be transversely offset distances 159b and 161b from first longitudinal edge 110 and/or second longitudinal edge 112, respectively. The distances 151b, 157b, and 159b can have different values with respect to one another. In some embodiments, two or more of the distances 151b, 157b, and 159b can be the same. For example, as shown in FIG. 4, the distances 151b and 159b are the same and are both smaller than the distance 157b. The distances 153b, 155b, and 161b can have different values with respect to one another. In some embodiments, two or more of the distances 153b, 155b, and 161b can be the same. For example, as shown in FIG. 4, the distances 157b and 161b are the same and are both smaller than the distance 155b. In other embodiments, as shown for example in FIG. 15B, the distances 151b and 157b are the same and are both larger than the distance 159b. In other embodiments, as shown for example in FIG. 5, the distances 155b and 153b are the same and are both larger than the distance 161b. The secondary openings 129b/152b can be transversely oriented apertures having a longer transverse distance 169b than the longitudinal distance 167b. The longitudinal distance 169b can be greater than the offset 133b.

Figure 5:
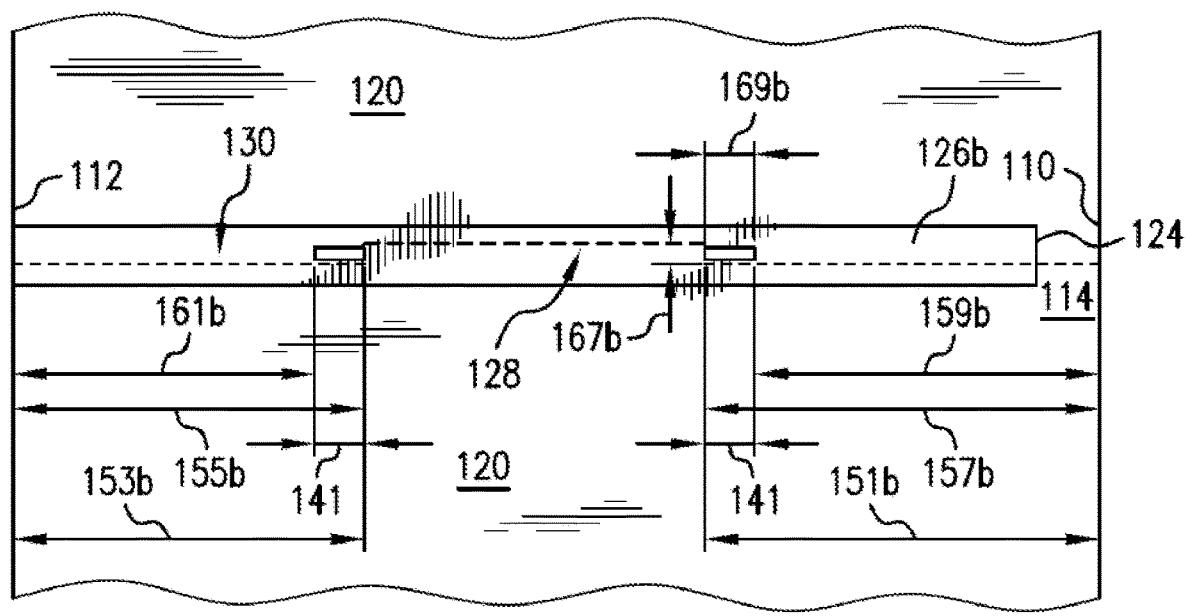
FIG. 5 is a schematic of a separation region usable in conjunction with the flexible structure of FIG. 1, in accordance with one embodiment.
Figure 6:
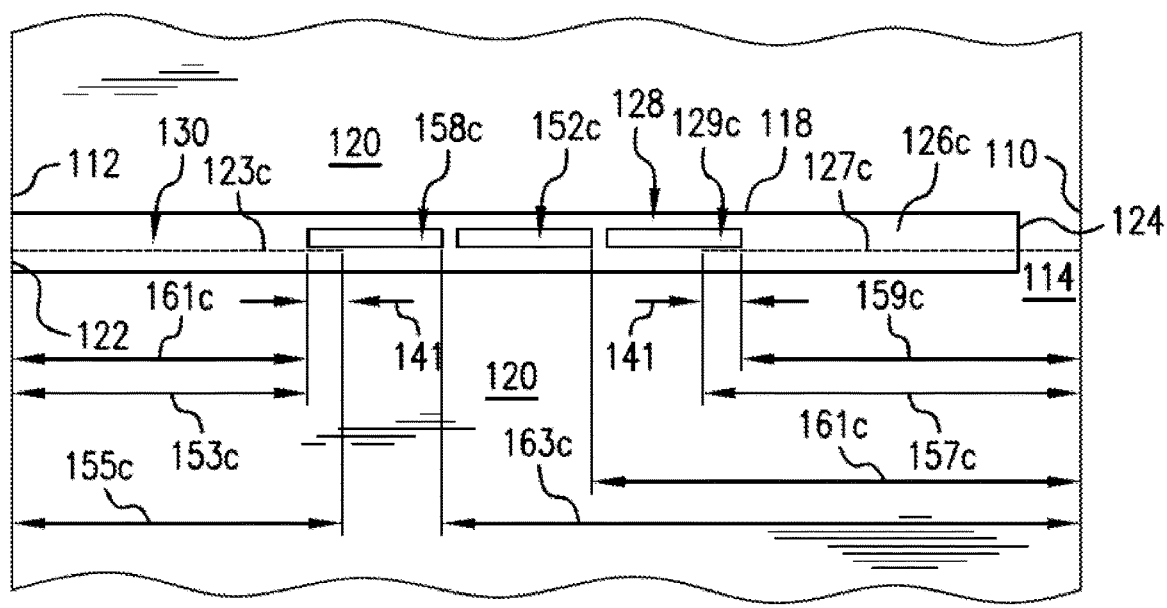
FIG. 6 is a schematic of a separation region usable in conjunction with the flexible structure of FIG. 1, in accordance with one embodiment.
Figure 7A:
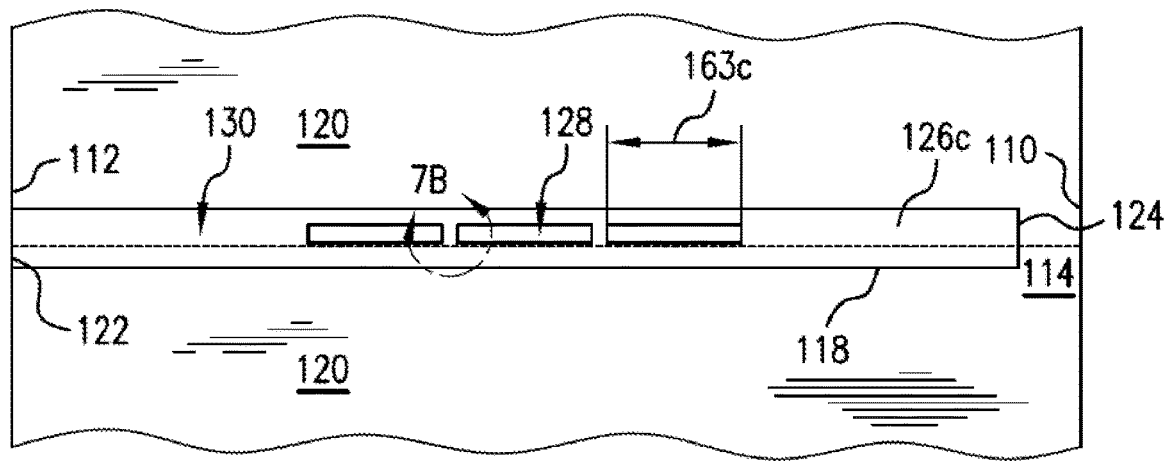
FIG. 7A is a schematic of a separation region usable in conjunction with the flexible structure of FIG. 1, in accordance with one embodiment.

The embodiment shown in FIGS. 6 and 7A are similar to those of FIGS. 4 and 5. In this embodiment, the tear initiation feature 128 can have one or more secondary openings 129c, 152c, 158c. In other embodiments such as shown in FIG. 7A, the tear propagation line 130 has only a first line of weakness 127c. The secondary openings 129c, 152c, 158c can be longitudinally offset from the first, and/or second lines of weakness 127c, 123c a distance 133c, as shown for example in FIG. 7B.

Figure 7B:
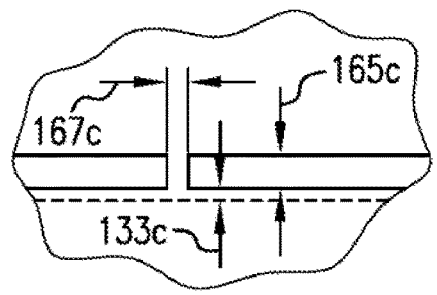
FIG. 7B is a detail view of the separation region of FIG. 7A.

The first line of weakness 127c can be longitudinally offset from the second line of weakness 123c and can be longitudinally offset from the secondary openings 129c, 152c, 158c a distance 133c. The distances 133c are similar in scope to distances 133b of FIG. 4. As shown in FIG. 6, the first line of weakness 127c, and the second line of weakness 123c are co-linear. The secondary openings 129c, 152c, 158c can be any suitable opening through the web 100 allowing a user to hold onto the web or otherwise extend a hand, finger, tool, or similar feature through the web 100. For example, the secondary opening 129c, 152c, 158c can be a slit, a perforation, a rectangular or oval-shaped opening, or the like. The secondary openings 129c, 152c, 158c can be transversely offset distances 159c, 161c, and 163c from first longitudinal edge 110. The first and second lines of weakness 127c, 123c transversely overlap the respective secondary openings 129c, 158c by a distance 141. The secondary openings 129c, 152c, 158c can be a transversely oriented aperture having a longer transverse distance 163c than the longitudinal distance 165c. As shown in FIG. 7B, the longitudinal distance 165c is greater than the offset 133c. The secondary openings 129c, 152c, 158c can be transversely offset from one another a distance 167c.

Figure 8A:
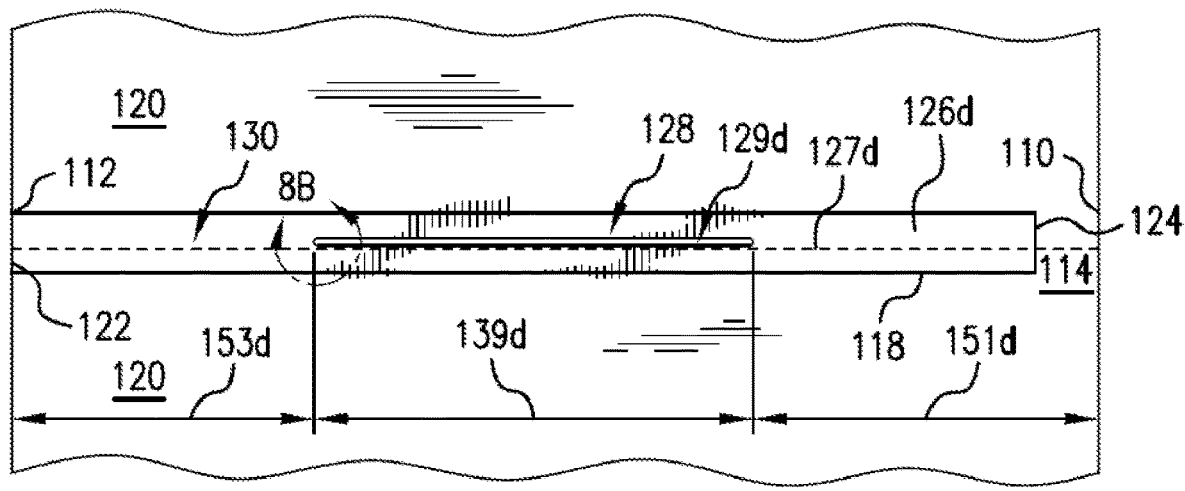
FIG. 8A is a schematic of a separation region usable in conjunction with the flexible structure of FIG. 1, in accordance with one embodiment.
Figure 8B:
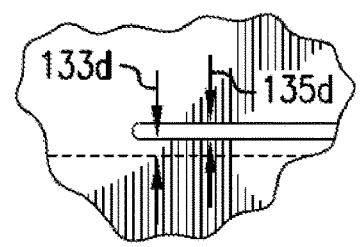
FIG. 8B is a detail view of the separation region of FIG. 8A.

In accordance with one embodiment, as shown in FIG. 8A, the inflatable chambers 120 can be separated by separation regions 126d usable in conjunction with the web 100 of FIG. 1. As shown, the separation region 126d includes a tear initiation feature 128 and a tear propagation line 130. The tear propagation line 130 includes a line of weakness 127d extending transversely across a portion of the web 100. While the line of weakness 127d is shown as extending across the inflation channel 114, denoted by the distance D in FIG. 1, it is appreciated that the line of weakness 127d can also terminate with the seal 118 at or proximate seal end 124. The tear initiation feature 128 includes a secondary opening 129d. The secondary opening 129d can be any suitable opening through the web 100 allowing a user to hold onto the web or otherwise extend a hand, finger, tool, or similar feature through the web 100. For example, the secondary opening 129d can be a rectangular or oval-shaped opening (as shown for example in FIG. 8A), or the like. As shown in FIG. 8A, the ends of the secondary opening 129d are substantially semi-circular. Such ends can enable a user to grasp an edge of the opening and pull on the web 100 thereby inducing a tear in the tear propagation line 130, without the tear starting in the edge of the secondary opening. As shown in FIG. 8A, the secondary opening 129d can be a transverse aperture having both a significant longitudinal distance 135d and a significant transverse distance 139d. The longitudinal distance 135d can be greater than the width of the line of weakness 127d. The secondary opening 129d can extend parallel to the line of weakness 127d.

As shown in FIG. 8A, the line of weakness 127d extends a distance longer than the transverse distance 139d of the secondary opening 129d. In other examples, the secondary opening 129d is transversely offset from the first longitudinal edge 110 a distance 151d. Additionally or alternately, the secondary opening 129d can be transversely offset from the second longitudinal edge 112 a distance 153d. The line of weakness 127d can be longitudinally offset from the secondary opening 129d a distance 133d. In some examples, the distance 133d is the same as or less than the connection distance between perforations in embodiments in which the line of weakness 127d is a perforation (e.g., FIG. 8A shows the line of weakness 127d as a transverse perforation). In other examples, the distance 133d is greater than the connection distance between perforations in embodiments in which the line of weakness 127d is a perforation (e.g., the row of holes shown in FIG. 8A).

Figure 9:
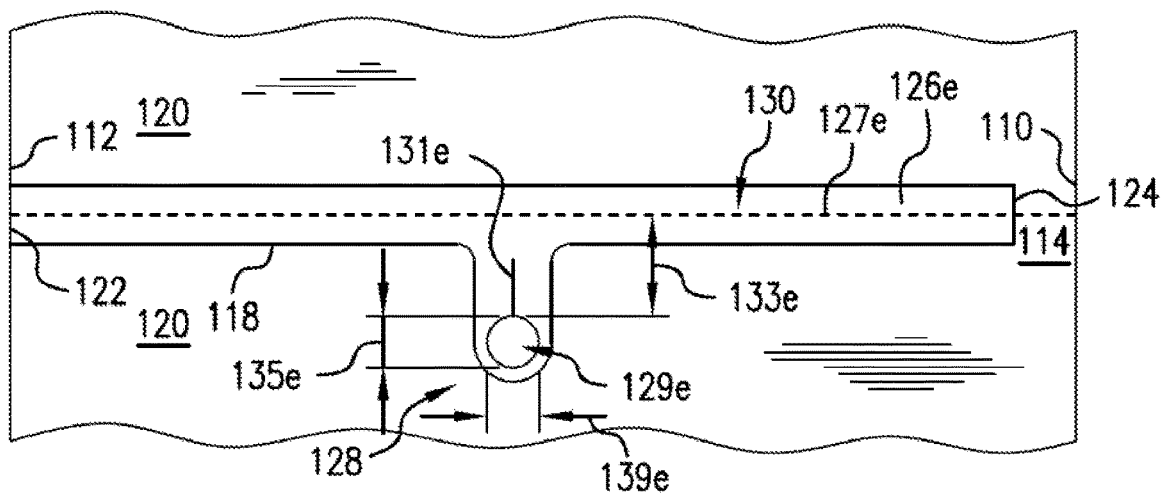
FIG. 9 is a schematic of a separation region usable in conjunction with the flexible structure of FIG. 1, in accordance with one embodiment.

In accordance with one embodiment, as shown in FIG. 9, the inflatable chambers 120 can be separated by separation regions 126e usable in conjunction with the web 100 of FIG. 1. The separation region 126e includes a tear initiation feature 128 and a tear propagation line 130. The tear propagation line 130 includes a line of weakness 127e extending transversely across the web 100. While the line of weakness 127e is shown as extending across the inflation channel 114, denoted by the distance D in FIG. 1, it is appreciated that the line of weakness 127e can also terminate with the seal 118 at or proximate seal end 124. The tear initiation feature 128 includes a secondary opening 129e. The secondary opening 129e can be longitudinally offset from the line of weakness 127e a distance 133e. In some examples, the distance 133e is the same as or less than the connection distance between perforations in embodiments in which the line of weakness 127e is a perforation (e.g., FIG. 9 shows the line of weakness 127e as a transverse perforation). In other examples, the distance 133e is greater than the connection distance between perforations in embodiments in which the line of weakness 127e is a perforation.

As shown in FIG. 9, the line of weakness 127e extends a distance longer than the secondary opening 129e. The secondary opening 129e can be any suitable opening through the web 100 allowing a user to hold onto the web or otherwise extend a hand, finger, tool, or similar feature through the web 100. For example, the secondary opening 129e can be an aperture having a shape that is generally a rectangle, circle, oval, or the like. As shown in FIG. 9, the secondary opening 129e can be an aperture having a similar longitudinal distance 135e and transverse distance 139e. The longitudinal distance 135e can be greater than the offset 133e. In some examples, the tear initiation feature 128 also includes a longitudinal appendage 131e extending from the secondary opening 129e longitudinally toward the line of weakness 127e. Such an appendage 131e renders the secondary opening 129e generally perpendicularly oriented relative to the line of weakness 127e. The appendage 131e allows, enables or otherwise improves the ability of the secondary opening 129e to tear toward the line of weakness 127e when a user pulls on the secondary opening 129e, such as by providing a stress riser to initiate tearing. In some embodiments, the appendage 131e is a cut from the secondary opening 129e. In other embodiments, the appendage 131e is a line of perforation extending toward the line of weakness 127e from the secondary opening 129e. Depending upon the position of the secondary opening 129e and the appendage 131e, a pulling force on the secondary opening 129e can initiate a tear from a corresponding transverse position along the line of weakness 127e. For example, as shown in FIG. 9, the secondary opening 129e and appendage 131e are positioned in a generally central position relative to the line of weakness 127e, such that a pulling force on the secondary opening 129e can initiate a tear from a central portion of the line of weakness 127e.

Figure 10:
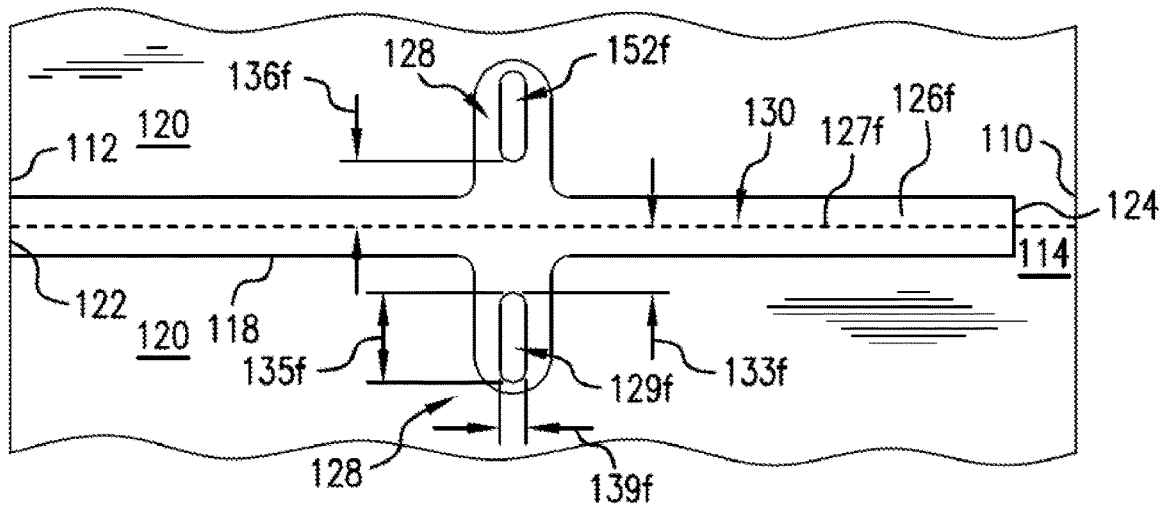
FIG. 10 is a schematic of a separation region usable in conjunction with the flexible structure of FIG. 1, in accordance with one embodiment.

In accordance with one embodiment, as shown in FIG. 10, the inflatable chambers 120 can be separated by separation regions 126f usable in conjunction with the web 100 of FIG. 1. The separation region 126f includes a tear initiation feature 128 and a tear propagation line 130. The tear propagation line 130 includes a line of weakness 127*f* extending transversely across the web 100. While the line of weakness 127*f* is shown as extending across the inflation channel 114, denoted by the distance D in FIG. 1, it is appreciated that the line of weakness 127*f* can also terminate with the seal 118 at or proximate seal end 124. The tear initiation feature 128 includes a secondary opening 129*f* and a second secondary opening 152*f*. The secondary opening 129*f* can be longitudinally offset from the line of weakness 127*f* a distance 133*f*. In some examples, the distance 133*f* is the same as or less than the connection distance between perforations in embodiments in which the line of weakness 127*f* is a perforation (e.g., FIG. 10 shows the line of weakness 127*f* as a transverse perforation). In other examples, the distance 133*f* is greater than the connection distance between perforations in embodiments in which the line of weakness 127*f* is a perforation.

The secondary opening 129*f* can be any suitable opening through the web 100 allowing a user to hold onto the web or otherwise extend a hand, finger, tool, or similar feature through the web 100. For example, the secondary opening 129*f* can be an aperture having a shape that is generally a rectangle, circle, oval, or the like. As shown in FIG. 10, the secondary opening 129*f* can be a longitudinally oriented aperture having a longer longitudinal distance 135*f* than the transverse distance 139*f*. The longitudinal distance 135*f* can be greater than the offset 133*f*. The longitudinal distance 135*f* can be greater than the offset 133*f*. In this embodiment, the secondary opening 129*f* extends perpendicular to the line of weakness 127*f*.

As shown in FIG. 10, the line of weakness 127*f* extends a transverse distance longer than the transverse distance 139*f* of the secondary opening 129*f*. In the embodiment shown in FIG. 10, there can be a second secondary opening 152*f* in the tear initiation feature 128 on an opposing side of the line of weakness 127*f*, such that the second secondary opening 152*f* mirrors the secondary opening 129*f* discussed above (e.g., the second secondary opening 152*f* has a substantially similar shape, size, orientation, and longitudinal offset from the line of weakness 127*f* as the secondary opening 129*f*). The second secondary opening 152*f* can be longitudinally offset from the line of weakness 127*f* a distance 136*f*. In some examples, the distance 136*f* is the same or substantially the same distance as the distance 133*f*. In this way, regardless of how the web 100 travels through an inflation machine, a secondary opening 129*f*, 152*f* will always be upstream of the lines of weakness 127*f*.

Figure 11:
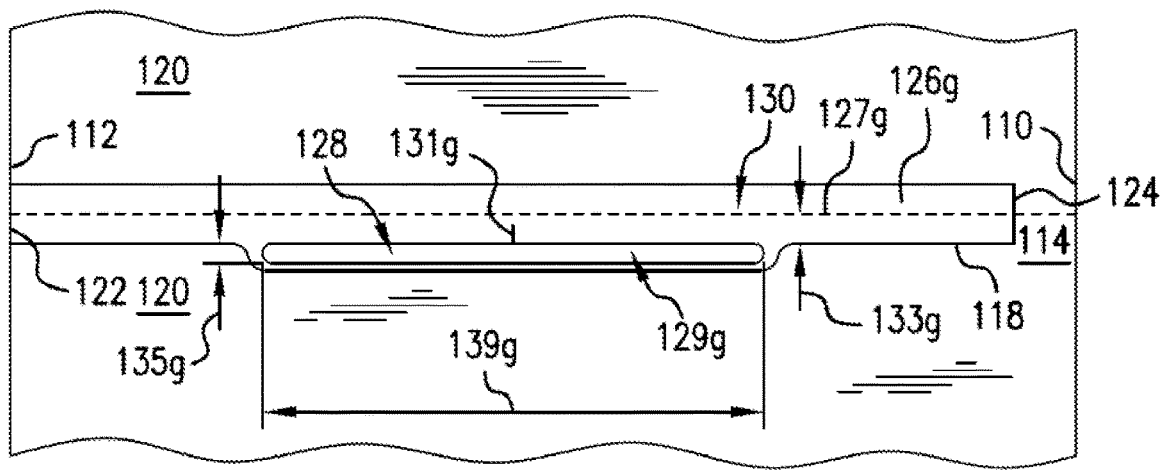
FIG. 11 is a schematic of a separation region usable in conjunction with the flexible structure of FIG. 1, in accordance with one embodiment.

In accordance with one embodiment, as shown in FIG. 11, the inflatable chambers 120 can be separated by separation regions 126*g* usable in conjunction with the web 100 of FIG. 1. The separation region 126*g* includes a tear initiation feature 128 and a tear propagation line 130. The tear propagation line 130 includes a line of weakness 127*g* extending transversely across the web 100. While the line of weakness 127*g* is shown as extending across the inflation channel 114, denoted by the distance D in FIG. 1, it is appreciated that the line of weakness 127*g* can also terminate with the seal 118 at or proximate seal end 124. The tear initiation feature 128 includes a secondary opening 129*g*. The secondary opening 129*g* can be longitudinally offset from the line of weakness 127*g* a distance 133*g*. In some embodiments, the distance 133*g* is the same as or less than the connection distance between perforations in embodiments in which the line of weakness 127*g* is a perforation (e.g., FIG. 11 shows the line of weakness 127*g* as a transverse perforation). In other examples, the distance 133*g* is greater than the connection distance between perforations in embodiments in which the line of weakness 127*g* is a perforation.

As shown in FIG. 11, the line of weakness 127*g* extends a distance longer than the secondary opening 129*g*. The secondary opening 129*g* can be any suitable opening through the web 100 allowing a user to hold onto the web or otherwise extend a hand, finger, tool, or similar feature through the web 100. For example, the secondary opening 129*g* can be a slit, a perforation, a rectangular or oval-shaped opening, or the like. As shown in FIG. 11, the secondary opening 129*g* can be a transversely oriented aperture having a longer transverse distance 139*g* than the longitudinal distance 135*g*. The longitudinal distance 135*g* can be greater than the offset 133*g*. In some embodiments, the tear initiation feature 128 also includes a longitudinal appendage 131*g* extending from the secondary opening 129*g* longitudinally toward the line of weakness 127*g*. Such an appendage 131*g* allows, enables, or otherwise improves the ability of the secondary opening 129*g* to tear toward the line of weakness 127*g* when a user pulls on the secondary opening 129*g*. In some examples, the appendage 131*g* is a cut from the secondary opening 129*g*. In other examples, the appendage 131*g* is a line of perforation extending toward the line of weakness 127*g* from the secondary opening 129*g*. Depending upon the position of the secondary opening 129*g* and the appendage 131*g*, a pulling force on the secondary opening 129*g* can initiate a tear from a corresponding transverse position along the line of weakness 127*g*. For example, as shown in FIG. 11, the secondary opening 129*g* and appendage 131*g* are positioned in a generally central position relative to the line of weakness 127*g*, such that a pulling force on the secondary opening 129*g* can initiate a tear from a central portion of the line of weakness 127*g*.

Figure 12B:
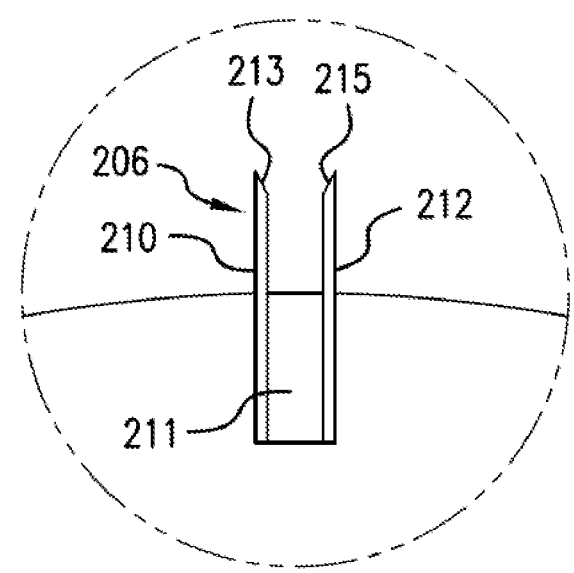
FIG. 12B is a partial detail view of a portion of the machine of FIG. 12A.

FIG. 12A shows a partial schematic view of an embodiment of a stamping machine 200 suitable for placing any of the lines of weakness disclosed into a web 100. FIG. 12B shows an alternate, partial plan view of the stamping machine 200 of FIG. 12A. In the embodiment shown, the stamping machine 200 includes a rolling drum 202 and a facing drum 204. The rolling drum 204 includes a dye 206. The dye 206 can include a first stamping element 210 and a second stamping element 212 separated by a spacer 211. The dye 206 can include more or fewer stamping elements and more or fewer spacers, in accordance with the various embodiments of separation regions disclosed herein. In some embodiments, the stamping elements 210,212 are cutters 210,212. Cutters 210,212 can be thin elongate blades. In some embodiments, the spacer 211 is one or more shims. In other embodiments, the spacer 211 can be integrally formed with the rolling drum 202. In various embodiments, the spacer 211 separates the stamping elements 210,212 by between 0.030 inches and 0.090 inches, inclusive. In other embodiments, the spacer 211 separates the stamping elements 210,212 by between 0.015 inches and 0.120 inches, inclusive.

As shown in FIG. 12B, the stamping elements 210 and 212 can each have a respective plurality of cutting elements 213,215. In the embodiment shown, the cutting elements 213 are thin, linear edges spaced apart from one another. Likewise, the cutting elements 215 are thin, linear edges spaced apart from one another. The cutting elements 215 are each of a smaller length than the cutting element 213. This embodiment can be appropriate to form a separation region like 126*a* of FIG. 2. Other types, shapes, numbers, and spacing between cutting elements 213 and 215 are contemplated, in accordance with the various separation regions disclosed herein.

The facing drum includes a recess 208 corresponding to the dye 206. The rolling drum 202 and the facing drum 204 rotate in a synchronized fashion. For example, the rolling drum 202 can rotate in a direction 201, and the facing drum 204 can rotate in a direction 203, such that as the web 100 passes between the drums 202, 204 the dye 206 and the recess 208 periodically come together, and the dye 206 punctures one or both plies 105,107 of the web 100 to impart separation regions 126, including lines of weakness, to the plies 105,107 of the web 100. The dye 206 can be at least partially received within the recess 208. The diameters of the drums 202, 204 can be varied to change the spacing between successive separation regions 126 disposed along the web 100 between adjacent chambers 120. The rotation of the drums 202, 204 can be synchronized with any suitable mechanism, such as mating gears, a synchronization or timing belt or chain and corresponding sprockets.

As shown in FIG. 12A, the rolling drum 202 includes three sets of dyes 206, and the backing drum 204 includes three corresponding recesses 208. A web 100 passes between the drums 202 and 204, over an idler 220, and is taken up by a take-up roll 218. Other numbers of dyes and recesses, are contemplated to correspond to different webs 100. In the embodiment shown in FIG. 12A, the stamping machine is configured to place a separation region 126 within alternating seals 118. Other embodiments can place separation regions in each of the transverse seal regions. Other embodiments still can place separation regions in seals, skipping different numbers of transverse seals 118. For example, a stamping machine can place separation regions in every third, fourth, fifth, or sixth seal. In other embodiments, a stamping machine 200 can place a separation region in a seal 118 and skip two or more seals before placing another separation region 126.

Figure 13:
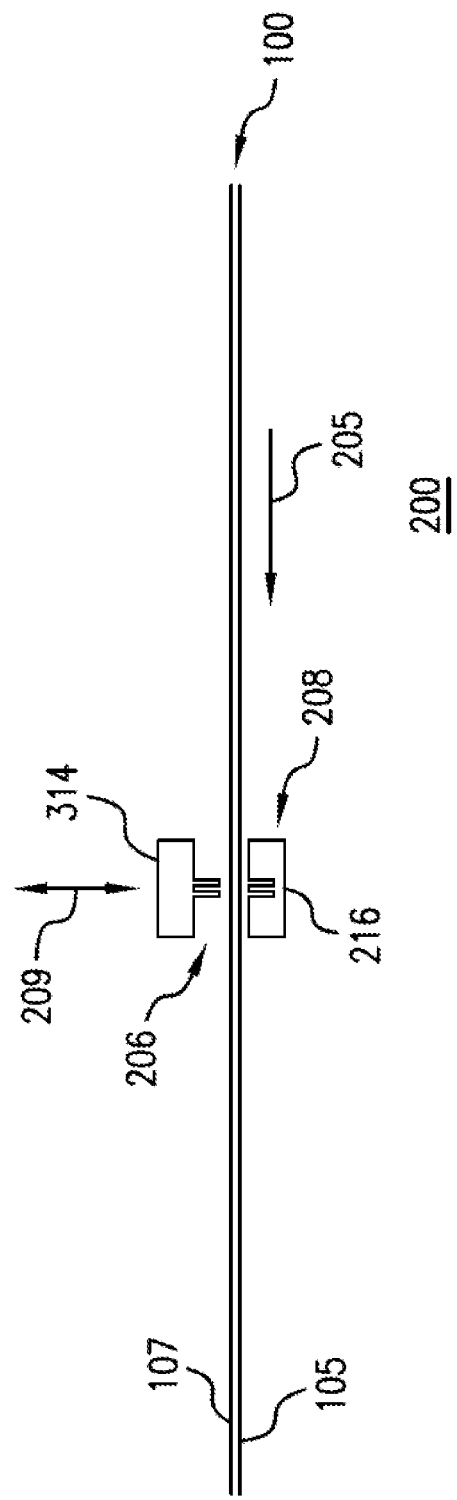
FIG. 13 is a schematic view of a stamping machine for creating separation regions in a web according to embodiments of the present disclosure.

FIG. 13 shows a partial schematic view of another embodiment of a stamping machine 200. In this embodiment, the machine 200 includes a reciprocating element 214 that reciprocates back and forth relative to a backing element 216, as shown by directional arrows 209. In various embodiments, the reciprocating element 214 can include a dye 206, or a recess 208. In various other embodiments, the backing element 216 can include a dye 206, or a recess 208. As shown, the reciprocating element 209 reciprocates back and forth as the web 100 passes between the reciprocating element 214 and the backing element 216. As the reciprocating element 214 moves down toward the backing element, the dye 206 punctures one or both plies 105, 107 of the web 100 to impart separation regions 126, including lines of weakness, to the plies 105,107 of the web 100. The dye 206 can be at least partially received within the recess 208.

In various embodiments, the distances 133 and 136 are less than 50 mils. In other embodiments, the distances 133 and 136 are from 10-20 mils.

Any of the various separation regions 126a-g discussed in the embodiments above can be disposed along the longitudinal extent of the film 100 and extend transversely across the first and second plies of the film 100. Each separation region 126a-g extends from the second longitudinal edge 112 and toward the first longitudinal edge 110, along at least a portion of the transverse width of the film 100. Each separation region 126 in the web 100 is disposed between a pair of adjacent chambers 120. Preferably, each line of weakness is disposed between two adjacent transverse seals 118 and between two adjacent chambers 120, as depicted in FIG. 1. In other embodiments, the lines of weakness are disposed in a wide seal as shown in FIGS. 2-11. The separation regions 126 facilitate separation of adjacent inflatable cushions 120.

While the secondary openings 129e, 129g of FIGS. 9, 11 are the only embodiments depicted with longitudinal appendages 131e, 131g, respectively, it is contemplated that one or more longitudinal appendages can be included with a secondary opening of any embodiment. The appendage can be a slit or line of perforation extending longitudinally toward a line of weakness from the secondary opening. In other embodiments, an appendage can extend diagonally across the web 100, extending both longitudinally and transversely. In the same manner as discussed above with respect to FIGS. 9 and 11, the appendage allows, enables or otherwise improves the ability of the secondary opening to tear toward the line of weakness when a user pulls on the secondary opening. Depending upon the position of the secondary opening and the appendage, a pulling force on the secondary opening can initiate a tear from a corresponding transverse position along the line of weakness. For example, in some embodiments, the appendage can extend toward a central portion of the line of weakness. In this manner, a pulling force on the secondary opening can create a tear of the transverse line of weakness that initiates in the central portion of the transverse line of weakness.

While the separation regions 126 disclosed are within the transverse seal 118 (e.g., as shown in FIG. 1), it is contemplated that one or more of the separation regions 126 can be outside the transverse seal 118, for example, within another adjacent seal (not shown) positioned adjacent the transverse seal 118. The adjacent seal can be positioned within the inflatable chamber 120, forming a sealed portion of the air chamber 120. The adjacent seal can extend along only a portion of the transverse width of the film 100 or across the entire transverse width of the film 100 parallel to the transverse seal 118. It is contemplated that a transverse line of weakness can be included within the transverse seal 118, while a corresponding secondary opening can be included within an adjacent seal, outside of and adjacent to the transverse seal 118. The adjacent seal can have a shape and size sufficient to surround the secondary opening while providing minimum interference to fluid such as air filling the chamber 120.

Alternatively, as previously discussed, it is contemplated that the transverse seal 118 can have sealed portions around its periphery with a pocket in the middle portion. In this example, a transverse line of weakness can be located in a sealed portion of the transverse seal 118, while a respective secondary opening can be included in an opposing sealed portion of the transverse seal 118. In this manner, a transverse line of weakness is in a separate sealed portion from a respective secondary opening.

In the examples where there is either more than one transverse line of weakness (e.g., transverse lines of weakness 125a, 127a in FIG. 2) or more than one secondary opening (e.g., secondary openings 129b, 152b in FIG. 4), two of the separation regions 126 can be included in one seal (e.g., the transverse seal 118) or sealed portion (e.g., a sealed edge of the transverse seal 118), while the remaining separation region can be included in another seal (e.g., the adjacent seal) or sealed portion (e.g., the opposing sealed edge of the transverse seal 118). For example, in FIG. 6, the secondary opening 152c and transverse line of weakness 127c can be included in the transverse seal 118 or in a sealed edge of the transverse seal 118, while the respective secondary opening 129c is included in a separate seal positioned within the inflatable chamber 120 adjacent the transverse seal 118 or within a sealed opposing edge of the transverse seal 118. In another example, the transverse seal 118 can have an additional distinct seal or sealed portion that includes the additional tear initiation feature 128, such that each tear initiation feature 128 is included in a different seal or sealed portion of the transverse seal 118. As one example, the transverse seal 118 has a sealed middle portion that includes the transverse line of weakness 125a, separate from respective transverse lines of weakness 127a which is included within sealed opposing edge portions of the transverse seal 118. As another example, the transverse seal 118 has a sealed middle portion that includes transverse lines of weakness 125e, 127e, separate from a respective secondary opening 129e, which is included within sealed opposing edge portions of the transverse seal 118. As another example, a transverse line of weakness 127a is included within the transverse seal 118, while the transverse line of weakness 125a is positioned within separate seals. As another example, transverse line of weakness 125e, 127e are included within the transverse seal 118, while the secondary opening 129e is positioned within separate seals.

The transverse lines of weakness can include a variety of lines of weakness known by those of ordinary skill in the art. For example, in some embodiments, the transverse lines of weakness include a row of perforations, in which the row of perforations includes alternating lands and slits spaced along the transverse extent of the row. The lands and slits can occur at regular or irregular intervals along the transverse extent of the row. Alternatively, for example, in some embodiments, the transverse lines of weakness include score lines or the like formed in the web material.

The transverse lines of weakness and/or secondary openings can be formed from a variety of techniques known to those of ordinary skill in the art. Such techniques include, but are not limited to, cutting (e.g., techniques that use a cutting or toothed element, such as a bar, blade, block, roller, wheel, or the like) and/or scoring (e.g., techniques that reduce the strength or thickness of material in the first and second plies, such as electromagnetic (e.g., laser) scoring and mechanical scoring).

This application is also copending with patent application Ser. No. 16/541,082 filed 14 Aug. 2019, entitled "Inflatable Packaging with Tear Initiation Feature", which is hereby incorporated by reference herein in its entirety for all purposes. Consistent with the disclosure therein and as a person of ordinary skill in the art would understand these applications, the various embodiments of the separation region disclosed in the copending application can be incorporated herein.

Figure 14:
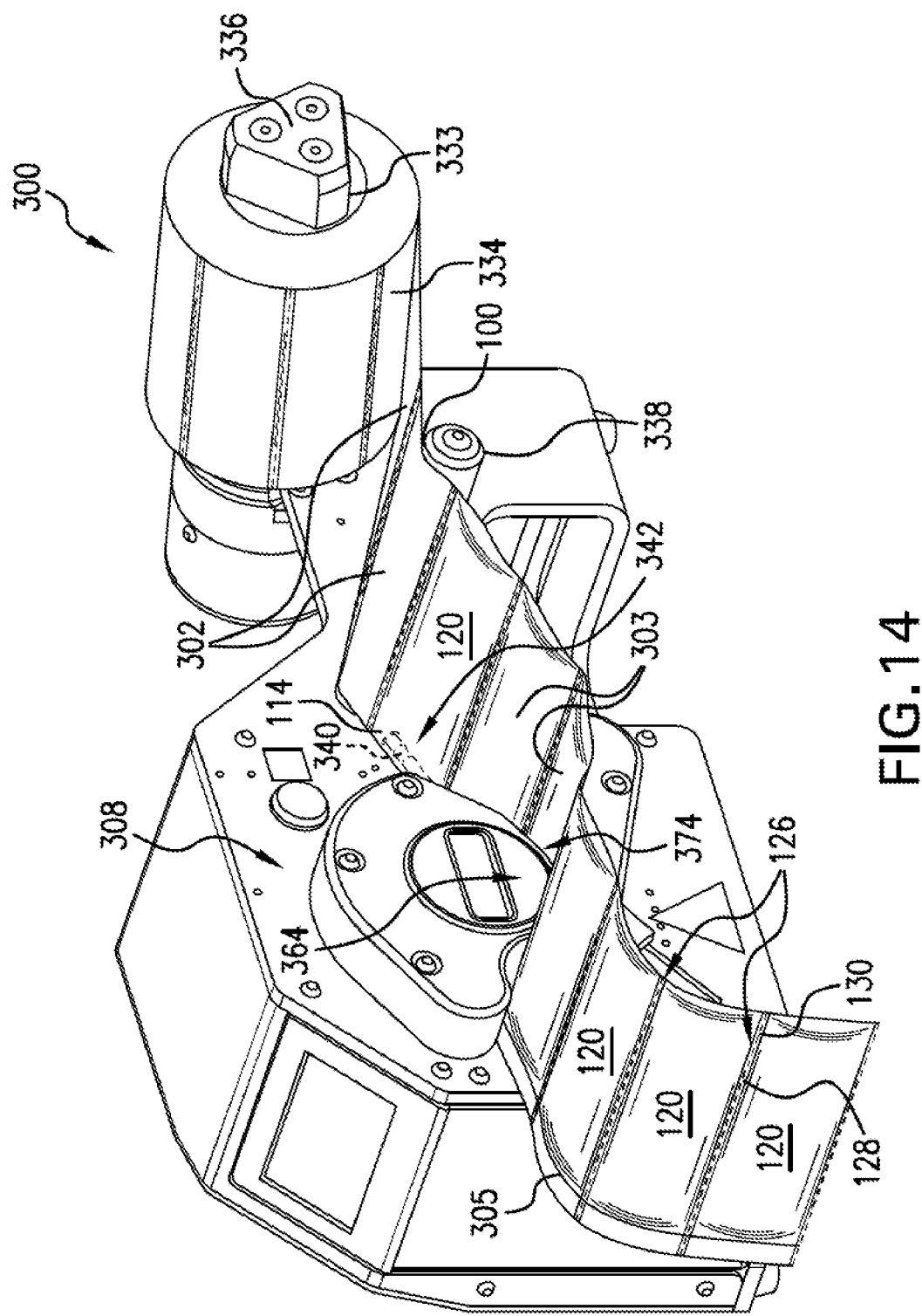
FIG. 14 is an isometric view of an inflation machine for inflating inflatable chambers of a web according to embodiments of the present disclosure.

FIG. 14 illustrates an example of an inflatable packaging sealing device 300 for use in sealing the inflatable flexible structures. The inflation and sealing device 300 may be operated to convert a flexible structure 100 of uninflated material 302 into a series of inflated pillows or cushions 303 by inflating chambers 120. As shown in FIG. 14, the uninflated flexible structure 100 can be a bulk quantity of supply, uninflated material. For example, uninflated flexible structure 100 may be provided in bulk form on a roll to be inflated and sealed by the device 300. For example, the bulk quantity of uninflated material may be a roll of the material 334. The flexible structure 100 may be rolled around an inner support tube 333. Although, in other examples, the bulk quantity may be packaged in other suitable forms such as fanfold.

The inflation and sealing device 300 may include a bulk material support 336. The bulk quantity of uninflated material may be supported by the bulk material support 336. For example, in embodiments incorporating a roll of bulk material, the bulk material support may include a single roller that accommodates the center of the roll of web material 334. The roll of the material 334 may be suspended over the bulk material support 336, such as a spindle passing through the core 333 of the roll of the material 334. In another example, the bulk material support may be a tray operable to hold the uninflated material, which can be provided by a fixed surface or a plurality of rollers, for example. The tray may be concave around the roll or the tray may convex with the roll suspended over the tray. The bulk material support may include multiple rollers, which suspend the web. In various embodiments, the roll core is made of cardboard or other suitable materials.

In accordance with various embodiments, the inflation and sealing device 300 includes a fluid dispensing mechanism. As shown in the example of FIG. 14, the fluid dispensing mechanism is a nozzle 340. In other embodiments, the fluid dispensing mechanism can be other another suitable device configured to inject air into chambers 120 such as a wide vent, channel, manifold or the like. In emblements having a nozzle, the nozzle 340 is configured to inflate the uninflated material 302 forming inflated pillows or cushions 303 by inflating chambers 120. For example, the nozzle 340 engages an inflation region located at any transverse distance between the longitudinal edges. As shown in the example of FIG. 14 and in the various embodiments of the web discussed above, the inflation region is a channel 114 extending longitudinally along the length of the flexible structure 100 proximal to one edge. In the example shown in FIG. 14, the web 100 can roll off of material support 336 and over guide 338 in a manner that aligns the channel 114 of the flexible structure 100 with the nozzle 340 in inflation area 342. The inflation and sealing device 300 may be configured for continuous inflation of the flexible structure 100, as it is unraveled from the roll 334. The roll 334 includes the plurality of inflation chambers 120 that are arranged in series. The flexible structure 100 is advanced over the inflation nozzle 340 with the chambers 120 extending transversely with respect to the inflation nozzle 340 and an outlet on the inflation nozzle. The outlet, which can be disposed on a radial side and/or the upstream tip of the nozzle, for example, directs fluid from a nozzle body into the chambers 120 to inflate the chambers 120 as the flexible structure 100 advances along the material path in a longitudinal direction. The inflated flexible structure 100 is then sealed by a sealing mechanism in the sealing area 374 to form a chain of inflated pillows or cushions.

In other embodiments, the channel can be a central channel with chambers on both transverse sides of the inflation channel. In other embodiments, the inflation region can be an open passage along the longitudinal length of one edge of the flexible structure. For example, one edge of the flexible structure can have unattached plies of material. The Fluid dispensing mechanism (e.g. vent, channel, manifold, nozzle, etc.) can dispensing fluid between the plies as they are separated, inflating the chambers.

The inflation nozzle inserts fluid, such as pressured air, along a fluid path into the uninflated web material through nozzle outlets, inflating the material into inflated pillows or chambers 120. The inflation nozzle can include a nozzle inflation channel that fluidly connects a fluid source with the nozzle outlets. It is appreciated that in other configurations, the fluid can be other suitable pressured gas, foam, or liquid. The flexible structure 100 is fed over the inflation nozzle, which directs the web to the inflation and sealing assembly

308. The flexible structure 100 is advanced or driven through the inflation and sealing device 300 by a drive mechanism, such as by a driver or sealing device or the drive roller, in a downstream direction along a material path.

After being fed through the web feed area 364, the first and second plies are sealed together by the sealing assembly and exit the sealing device. The sealing device may include heating elements, such as thermocouples, which melt, fuse, join, bind, or unite the two plies or other types of welding or sealing elements. The web 100 is continuously advanced through the sealing assembly along the material path and past the sealing device at a sealing area 374 to form a continuous longitudinal seal 305 along the web by sealing the first and second plies together, and exits the sealing area. In various embodiments, the inflation and sealing device 300 further includes a cutting assembly to cut the web off the inflation nozzle when an inflation channel that receives and is closed around a longitudinal inflation nozzle is used.

In accordance with various embodiments, the inflation and sealing device can have any suitable drive mechanism for advancing the flexible structure 100 through the inflation and sealing device 300. For example, one belt may drive the various rollers and a second belt may pinch the web against a sealing device such as a drum. In various embodiments, the inflation and sealing device may have no belts. For example, a sealing drum may pinch the web against a stationary platform and drive the web thorough the inflation and sealing device at the same time. In another example, rollers may advance the flexible structure 100 through the inflation and sealing device 300.

Examples of components that may be utilized within an inflation and sealing device 300, including without limitation, the nozzle, blower, sealing assembly, and drive mechanisms, and their various components or related systems may be structured, positioned, and operated as disclosed in any of the various embodiments described in the incorporated references such as, for example, U.S. Pat. Nos. 8,061,110; 8,128,770; U.S. Patent Publication No. 2014/0261752; and U.S. Patent Publication No. 2011/0172072 each of which is herein incorporated by reference. Each of the embodiments discussed herein may be incorporated and used with the various sealing devices of the incorporated references and/or other inflation and sealing devices. For example, suitable mechanisms discussed herein and/or in the incorporated references may be used in the inflation and sealing of flexible structure 100.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can vary. It is also to be understood that the terminology used herein is for describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

As will be understood by one skilled in the art, for any and all purposes, all references to order, (e.g., first, second, third), are only used for identification purposes to aid the reader's understanding of the present invention, and do not create limitations, particularly as to the position, orientation, or use of the invention. Such recitations of order do not limit the scope of disclosure in any way, and elements may be claimed with such references in any order without departing from the present disclosure.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A system for making an inflatable web, comprising:
   a cutting mechanism configured to receive a web that has first and second plies that are sealed to each other to define first and second inflatable chambers therebetween, and an inflation region in fluid communication with the inflatable chambers to direct fluid to the inflation chambers, which inflatable chambers are inflatable to space the plies from each other, the cutting mechanism including a dye configured to make a separation region into at least one of the plies extending at least partially transversely across the web between the first and second inflatable chambers, the separation region being configured to facilitate separation of the first and second fillable chambers, wherein the dye configures the separation region to include:
      a tear propagation line extending transversely across at least a portion of the web with an end of the tear propagation line terminating proximal to the first longitudinal edge of the web or the inflation region, and
      a tear initiation feature including edges spaced apart from one another longitudinally to form a permanent opening in the web and close enough to the tear propagation line that a force imparted to the web via the tear initiation feature will facilitate the initiation of a tear of the web such that the tear propagates to and along the tear propagation line and allowing for the tearing of the web to separate the first and second inflatable chambers.

2. The system of claim 1, wherein the dye is configured such that the tear propagation line includes a first line of weakness extending transversely across a portion of the web.

3. The system of claim 1, wherein the dye is configured such that the tear initiation feature is configured to facilitate the engagement between a user and the web for tearing.

4. The system of claim 2, wherein the dye is configured such that the tear propagation line includes a second line of weakness extending transversely across at least a portion of the web with an end of the second line of weakness line terminating proximal to the second longitudinal edge of the web.

5. The system of claim 4, wherein the dye is configured such that the tear initiation feature is disposed between respective ends of the first line of weakness and the second line of weakness.

6. The system of claim 5, wherein dye is configured such that the respective lands are disposed between respective ends of the tear initiation feature and the first and second lines of weakness.

7. The system of claim 4, wherein dye is configured such that at least one of the first and second lines of weakness includes a line of perforations through at least one of the first ply or second ply.

8. The system of claim 1, wherein the dye is configured such that the tear initiation feature is transversely offset from both the first and second longitudinal edges.

9. The system of claim 1, wherein the dye is configured such that the tear initiation feature is in a generally central position relative to the transverse width of the web.

10. The system of claim 2, wherein the dye is configured such that the first line of weakness extends transversely across the web from the first longitudinal edge to the second longitudinal edge.

11. The system of claim 4, wherein the dye is configured such that the tear initiation feature is longitudinally offset from the tear propagation line.

12. The system of claim 11, wherein the dye is configured such that the tear initiation feature includes a pair of openings through the web and the openings are transversely offset from one another.

13. The system of claim 12, wherein the dye is configured such that the tear initiation feature includes a third line of weakness extending transversely across a portion of the web, and the third line of weakness is longitudinally offset from the pair of openings.

14. The system of claim 13, wherein the dye is configured such that the perforations of the third line of weakness are transversely larger than the perforations of the first line of weakness and the second line of weakness.

15. The system of claim 1, wherein the dye is configured such that the tear initiation feature and tear propagation line includes a line of perforations, slits, and/or openings that extend through the at least one of the plies.

16. The system of claim 1, wherein the dye is configured to make the separation region through both the first and second plies.

17. The system of claim 1, further comprising the inflatable web which is fed to the cutting mechanism such that the dye makes the separation region between the first and second chambers.

18. The system of claim 17, wherein the web includes a one-way valve fluidly communicating the inflation region to the chambers to allow for inflation of the chambers and to retain the fluid in the chambers.

19. The system of claim 1, further comprising a supply forming mechanism downstream of the cutting mechanism to receive the web from the cutting mechanism, wherein the supply forming mechanism is configured to consolidate the web into a bulk supply for use in an inflation and sealing device that inflates and seals the inflatable chambers.

20. The system of claim 19, wherein the supply forming mechanism is configured to form the web into a bulk supply roll that is configured for use in an inflation and sealing device that inflates and seals the inflatable chambers.

21. A method of forming an inflatable web, comprising:
   providing a first ply sealed to a second ply to form the inflatable web, the first and second plies define therebetween first and second inflatable chambers, and an inflation region in fluid communication with the inflatable chambers to direct fluid to the inflation chambers, the sealed plies having a first and second longitudinal edge; and cutting into the plies to form a tear propagation line into at least one of the plies, wherein the tear propagation line extends transversely across at least a portion of the web between the first and second inflatable chambers, wherein an end of the tear propagation line terminates proximal to the first longitudinal edge of the web or the inflation region; and cutting into the plies a tear initiation feature into at least one of the plies, wherein the tear initiation feature extends transversely across at least a portion of the web between the first and second inflatable chambers, wherein the tear initiation feature includes edges spaced apart from one another longitudinally to form a permanent opening in the web and is close enough to the tear propagation line that a force imparted to the web via the tear initiation feature will facilitate the initiation of a tear of the web such that the tear propagates to an end of the tear propagation line and allowing for the tearing of the web to separate the first and second inflatable chambers.

22. The method of claim 21, wherein:

cutting into the plies to form the tear propagation line includes cutting into the plies to form the tear propagation line through both of the plies; and cutting into the plies to form the tear initiation feature includes cutting into the plies to form the tear initiation feature through both of the plies.

23. A method of separating a packaging unit, comprising:

inflating inflatable chambers of an inflatable web, the inflatable web including a first ply sealed to a second ply via a plurality of transverse seals to define therebetween first and second inflatable chambers, and an inflation region in fluid communication with the inflatable chambers to direct fluid to the inflation chambers, the sealed plies having a first and second longitudinal edge;

sealing the first ply to the second ply via a longitudinal seal to close off the chambers from each other; and imparting a force to a tear initiation feature extending transversely across at least a portion of the web between the first and second inflatable chambers, wherein the tear initiation feature includes edges spaced apart from one another longitudinally to form a permanent opening in the web, wherein imparting the force to the tear initiation feature initiates the tear of the web such that the separation propagates to and along a tear propagation line extending transversely across at least a portion of the web between the first and second inflatable chambers, wherein the tear propagation line includes an end that terminates proximal to the first longitudinal edge of the web or the inflation region, wherein the separation along the tear propagation line separates the first and second chambers.

24. The method of claim 23, further comprising consolidating the web into a bulk supply for use in an inflation and sealing device that inflates and seals the inflatable chambers.

\* \* \* \* \*